Dec. 20, 1960 W. D. BOONE ET AL 2,965,116
EMERGENCY SHUT-OFF VALVE FOR REMOTE PUMP PEDESTAL UNITS
Filed Dec. 6, 1955 2 Sheets-Sheet 1
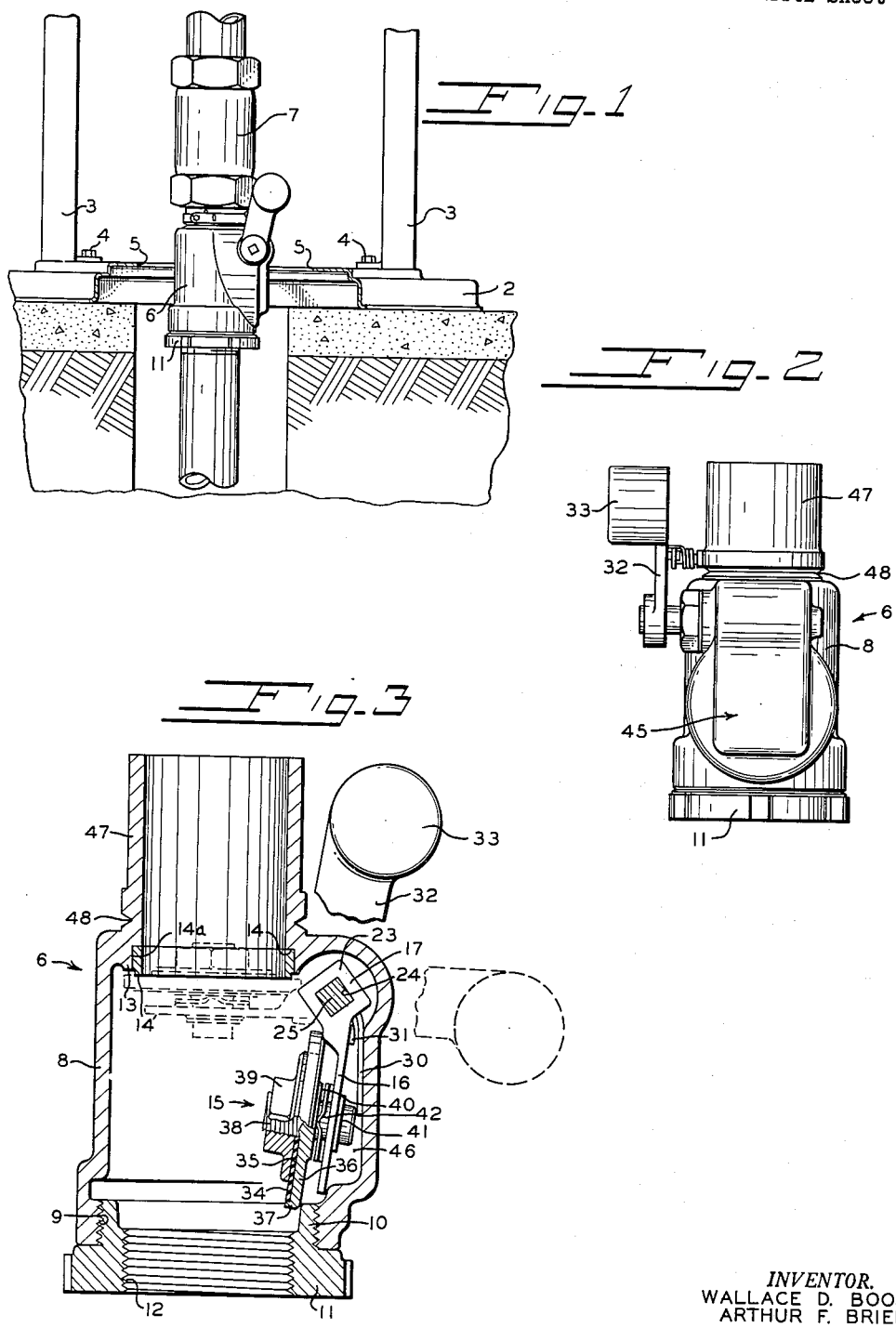
INVENTOR.
WALLACE D. BOONE
ARTHUR F. BRIEDE
BY
DES JARDINS, ROBINSON & KEISER
THEIR ATTORNEYS Dec. 20, 1960  W. D. BOONE ET AL  2,965,116
EMERGENCY SHUT-OFF VALVE FOR REMOTE PUMP PEDESTAL UNITS
Filed Dec. 6, 1955  2 Sheets-Sheet 2

INVENTOR.
WALLACE D. BOONE
ARTHUR F. BRIEDE
BY DES JARDINS, ROBINSON & KEISER

THEIR ATTORNEYS

United States Patent Office 2,965,116
Patented Dec. 20, 1960

2,965,116

EMERGENCY SHUT-OFF VALVE FOR REMOTE PUMP PEDESTAL UNITS

Wallace D. Boone and Arthur F. Briede, Cincinnati, Ohio, assignors to OPW Corporation, Cincinnati, Ohio, a corporation of Ohio Filed Dec. 6, 1955, Ser. No. 551,303

13 Claims. (Cl. 137—39)

This invention relates to an emergency shut-off valve for remote pump pedestal units, and more particularly for an emergency shut-off valve for supply lines from storage tanks which are connected to gasoline dispensing systems at filling stations.

The dispensing mechanism is mounted on a pedestal or frame which is anchored to a foundation above a storage tank that is buried beneath the foundation. The pedestal or frame surrounds a valve fitted to the end of the supply line through which the gasoline is pumped from the storage tank to the dispenser. While the surrounding pedestal or frame protects the valve from minor bumps from motor vehicles being supplied with gas, it cannot, of course, protect it from such major bumps that may break or loosen the pedestal or frame from its foundation and might injure the dispensing or feeding system, in which event it is desired to have the valve immediately closed to prevent the loss of gasoline and the hazard resulting therefrom, particularly fire.

Accordingly, one of the main objects of the invention is an emergency shut-off valve which will shut off when it is hit a hard blow, shear off and close when hit hard enough to break the piping, and shut off when subjected to excessive heat.

Another object of the invention is an emergency shut-off valve which is simple in construction and efficient in operation.

Another object of the invention is an emergency shut-off valve poppet which is moved substantially out of the area of flow when in open position.

Still another object of the invention is an emergency or other pipe valve poppet which is yieldably mounted for universally adjusting itself to the plane of the valve seat for assuring snug contact with the seat to prevent leakage.

Further objects, and objects relating to details of construction and economies of operation, will readily appear from the detailed description to follow. In one instance, the objects of the invention have been accomplished by the device and means set forth in the following specification. The invention is clearly defined and pointed out in the appended claims. A structure constituting a preferred embodiment of the invention is illustrated in the accompanying drawings, forming a part of this specification, in which:

Fig. 1 is a side elevation of the bottom and portion of a pedestal or frame and a valved connection from a storage tank to a dispensing system mounted on the pedestal.

Fig. 2 is another side elevation of the valve.

Fig. 3 is a vertical cross section of the valve, in open position, in full lines, and, in closed position, in dotted lines.

Figure 4:
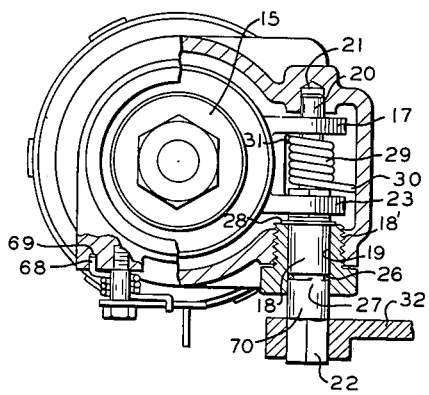
Fig. 4 is a top plan view.
Figure 5:
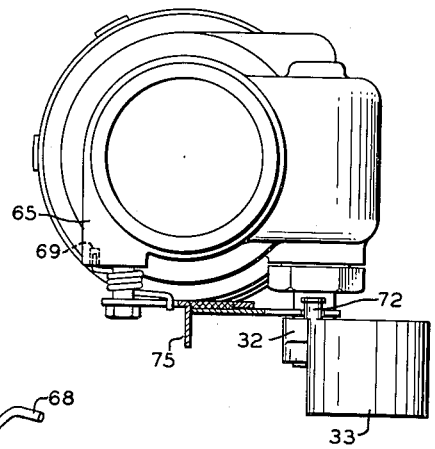
Fig. 5 is a top plan view and partly in horizontal cross section.
Figure 6:
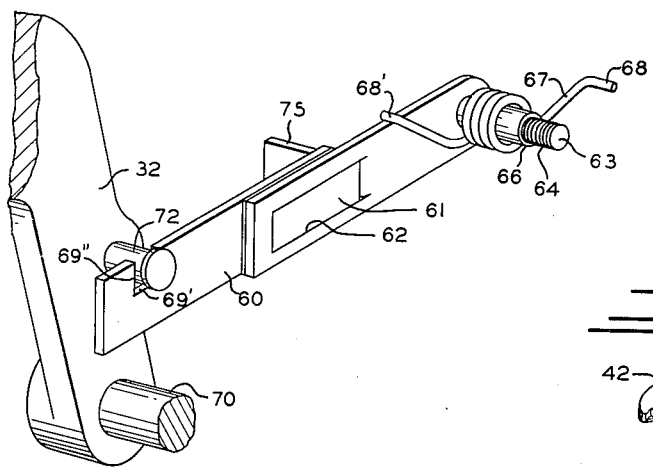
Fig. 6 is a detailed perspective view of the latching lever for the valve.
Figure 7:
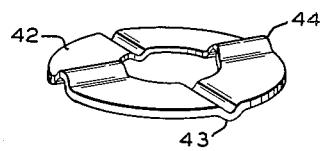
Fig. 7 is a detailed view of a compensator ring for the poppet mounting.

Referring specifically to the drawings in which like numerals designate like parts, numeral 2 is a base frame to which the bottom ends of posts 3 are secured as by bolts 4. The base frame has an opening 5 permitting it to be seated on a foundation over and surrounding a storage tank shut-off valve, referred to generally by numeral 6, that is fitted to a conduit connection 7 leading to a dispensing system, mounted on the posts 3 from said storage tank (not shown) buried beneath the foundation. The base and the post unit, for convenience, will be referred to as a pedestal.

The valve 6 comprises a hollow casing 8 having an interiorly threaded bottom end 9 for being connected to the threaded exterior end 10 of an adapter ring 11 which is connected to the supply tank by a pipe screw-threaded to the interiorly screw-threaded wall 12 of the adapter ring 11. An interior finished face 13 is provided in the hollow casing, offset from shoulder 14 to form an annular recess in which a ring 14a is inserted with an edge portion 14' projecting above the finished face 13 for seating a valve member, generally referred to as the poppet by numeral 15.

The poppet member is mounted on the end of carrier 16 whose opposite bifurcated end 17 is pivoted to a pin or stem 18 mounted in a packing nut 19, screw-threaded at 18' into a threaded opening in the wall of the casing. One end 20 of the stem 18, of reduced diameter, projects into a socket 21 in the opposite wall of the casing, and its opposite non-circular end 22 extends exteriorly of the casing to receive a handle or lever. One fork 23 of the bifurcated end 17 of carrier 16 has a non-circular opening 24 to conform to a non-circular portion 25 of the stem. A packing ring 26 is seated in an annular groove 27 in the wall of the stem for contacting the interior wall of the packing nut 19. The stem 18 is secured in place in the casing by a retaining ring 28 fitted to it and abutting against the end of the packing nut 19. A spring 29 is coiled about the stem, between the forked ends of the carrier 16, with one terminal end 30 abutting the interior wall of casing and the other terminal end 31 abutting the carrier 16 of the hereinafter described poppet assembly. This coiled spring 29 is tensioned to any desired degree for normally biasing the poppet to closed position on the valve seat 14'. A handle or lever 32 is fitted to the non-circular end of the stem 18 and has a weighted knob 33 on its free end.

The poppet comprises a disc 34 of any suitable material resistant to gasoline, such as rubber or some such composition. The poppet disc 34 is seated in a socket 35 which is formed on the face of the disc holder 36 by a surrounding flange 37. The poppet disc is centrally perforated for being fitted to an exteriorly threaded portion 38 projecting from the socket face 35 of the disc holder 36 and having a disc nut 39 screwed thereon adjacent the poppet disc 34, and the retaining carrier 16 fitted to its opposite projected end by means of a retaining ring 41. Interposed between this carrier 16 and the disc holder 36 is a compensator ring 42 and the adjacent face of the disc holder 36 preferably having a circular finished raised face 40 about the area of the compensator ring 42 against which said compensator ring abuts. The compensator ring 42 is provided with narrow transverse ribs 43 and 44 on its opposite faces. The rib or ribs 43 on one side face of the compensator ring are disposed at a right angle to the rib or ribs 44 on the other face. These ribs may be advantageously formed in a standard washer, and they provide two line contacts, disposed at right angles to each other, so that the valve disc holder 36 and assembly can tilt relatively to the compensator ring. The compensator ring, the poppet disc holder and the poppet assembly can tilt relatively to the carrier 16, thereby permitting substantial universal angularly tilting movement for the poppet disc to adjust itself to the horizontal plane of the valve seat so as to provide snug seating contact and prevent leakage. It will be understood that some play or lost motion will be provided between the finished face 40 of the disc holder 36 and carrier 16 for relative movement necessary for compensating the poppet disc 34 to its seat. The valve casing is provided with an enlarged portion 45 on one side wall to provide a sub-chamber 46 offset from the main conduit opening therethrough so that the entire poppet unit can be swung back into the sub-chamber 46, when the valve is open, substantially entirely out of the path of the flow of the liquid through the main conduit opening through the casing.

There is a top extension 47 on the valve casing to which conduit section 7, of the dispensing system, is connected in any conventional manner. The casing is exteriorly annularly grooved at 48 in a horizontal plane closely adjacent to the valve seat to permit said extension being sheared off, without damage to the valve, should it or the pedestal be rammed or bumped by a motor vehicle. Means, hereinafter described, is also provided for automatically closing the valve should it be open when the pedestal or conduit line is rammed or bumped or should the valve be subjected to fire.

This means comprises a sectional lever or arm 60, connected by a fusible plug 61, filling a recess 62 in one of the lapped ends of the arm sections. One end of the sectional arm 60 is pivoted to a bolt stud 63 having a screw-threaded reduced stepped end 64 screwed into a socket formed in an embossment 65 on the valve casing, the shoulder 66, resulting from the reduced stepped end 64, abutting against the embossment. A spring 67 is coiled about the bolt 63 with one terminal end 68 inserted in a recess 69 formed in the embossment 65 and the opposite terminal end 68' resting on the sectional arm 60. The free end, opposite the pivoted end, of the sectional arm 60 is recessed at 69' on its top edge for receiving a pin 72, projecting from one side of the operating valve lever 32, when the lever 32 is raised to open the valve. This pin will engage the recess 69' when the lever 32 is raised to open the valve. The pin is in position to be frictionally engaged by one side wall 69" of the recess 69', and the frictional contact is sufficient to overcome the bias of the spring 67 to release the lever from engagement with the pin. Hence any substantial jar to the valve casing will permit the spring 67 to overcome this frictional resistance of the side wall 69" of the recess 69' and automatically disengage the locking arm from the pin. This side wall 69" may advantageously be slightly inclined inwardly, about 10° off of perpendicular. The spring 29, which biases the poppet assembly to closed position, can function to close the valve. The valve is manually opened by raising the lever 32 and bringing locking arm 60 into locking position with the pin 72. The valve can be manually closed by disengaging the locking arm 60 from the valve operating lever. As stated above, the locking arm 60 will also automatically release the pin of the valve operating lever should the valve casing be jarred. The other spring 29 will then bias the valve to closing position, the valve lever moving downwardly with the pin 72 out of position for any accidental engagement with the recess in the locking arm. The weighted knob on the valve operating lever 32 will function to quicken closing of the valve when said lever is disengaged from the locking arm. This weighted lever, due to gravitation, is sufficient to cause the valve to close without the aid of spring 29.

The valve lever locking means is mounted on the extension 47 above the annular groove 48 so that its release from locking position will be assured should the extension 47 be broken off, and it will be rendered inoperative until repaired. It may also be noted that the free end of the locking lever or arm 60 will drop, in unlocking position, on the stem 18, that portion 70 between the lever 32 and the packing nut 19.

The extension 47 on the valve casing is adapted for being readily connected with any conventional type connection 7 leading to the dispensing unit. It is constructed to be completely sheared from the casing by 250 foot pounds of torque. The casing and extension are of cast material, such as iron, in order to be brittle and shear off cleanly. The wall of the fluid conduit is machined, as is the groove 48, to provide uniform thickness of metal.

It will be apparent that the valve can be easily locked open, but that the lock will be released by a jar, breaking of the extension, or by fire. When the locking lever is released, the valve is biased closed by the spring 29, assisted by the gravity action of the weighted valve handle or lever, and the flow of the liquid against the back of the valve poppet when moved out of the sub-chamber into the flow-through of the main chamber.

The fusible material 61 in the sectional handle will melt at predetermined temperature, preferably about 160° F. A feature of the invention is the manner in which the fusible plug is associated with the arm sections. It projects through the recess 62 in the lapped portion of one of the locking arm sections to be adhered to the lapped portion of the other arm section. This recess 62 is advantageously provided by a portion 75 partially cut out from the arm section and bent out to project from one side and serve as a handle for manually lifting the locking arm in and out of locking position when desired to do so.

From the foregoing description of the device and its operation, it will be obvious that there may be various changes in details of construction without departing from the spirit of the invention, and, therefore, the invention is claimed broadly as indicated by the appended claims,

Having thus described the invention, what is claimed as new and useful and desired to be secured by United States Letters Patent, is:

1. A shut-off valve comprising a casing having a valve seat mounted therein disposed in a horizontal plane, a valve mounting, including a valve poppet, pivoted to the casing, a carrier fixed to the mounting, and washer means interposed between the valve poppet and the carrier provided with means on its opposite sides for spacing said washer from the valve poppet and carrier to permit tilting of said valve poppet on two axes disposed at right angles to each other.

2. The shut-off valve of claim 1 in which means for permitting tilting of the valve disc is a compensator ring having a transverse rib on each of its two opposite faces disposed at right angles to each other.

3. A shut-off valve comprising a casing having a valve seat mounted therein and a poppet valve pivoted to said casing, a spring operatively associated with said poppet valve for biasing the poppet valve to closed position, a lever operatively connected with the poppet valve for moving said poppet valve to an open position, a sectional locking arm mounted on the casing and having means thereon frictionally engaging the lever when said poppet valve is open and blocking movement of the lever to poppet valve closing position, means biasing the locking arm so that it tends to move out of engagement with the lever, but is normally restrained from so moving the locking arm by the frictional engagement between the lever and said means on said locking arm, and a fusible plug adhering the locking arm sections together, whereby the poppet valve is normally frictionally held in open position unless abnormal shock transmitted to the casing or fusing of said plug causes the frictional engagement to be released.

4. The shut-off valve of claim 3 in which the biasing means for the locking arm is a spring.

5. The shut-off valve of claim 4 having a conduit connection joined thereto by a weakened joint adapted to be broken away from the casing.

6. The shut-off of claim 5 in which the casing is provided with an offset sub-chamber for receiving the valve poppet when said poppet is pivoted to open position.

7. A locking lever or arm for a shut-off valve comprising sections disposed end to end in overlapping relation, one of said lapped ends being provided with a handle bent from a perforation therein, fusible material filling said perforation and extending across the lapped joint throughout substantially the entire area of said lapped joint and adhered to the other lapped end which is nonperforated.

8. An emergency shut-off valve assembly comprising a casing having an extension thereon connected by a weakened joint to permit said extension being sheared from the casing, a valve seat mounted in the casing, a poppet assembly pivoted to the casing, an arm connected to the poppet assembly and having an engageable portion, latch means movably mounted on said extension and frictionally engaging said arm portion for locking the poppet assembly in open position, and means biasing said latch means so that it tends to move out of engagement with said arm portion, but is normally restrained from so moving the latch means by the frictional engagement between said latch means and said arm portion, whereby said poppet assembly is normally frictionally held in open position unless abnormal shock transmitted to the valve casing causes the frictional engagement to be released.

9. The emergency shut-off valve of claim 8 in which the poppet is universally adjustable for snugly fitting on the valve seat.

10. An emergency shut-off valve comprising a casing having an extension thereon connected by a shearable portion, a valve seat mounted in the casing, a poppet assembly pivoted to the casing in position to be moved on and off the valve seat, means for biasing the poppet assembly to seated position, a valve operating lever operatively associated with said poppet assembly and having a projection means thereon, a latch arm pivoted to the extension and adapted to latch with the projection means on the lever when the valve is open, means for biasing said latch arm away from latching position with the lever, and means frictionally engaging the latch arm and said projection means for normally holding the poppet assembly off the valve seat unless abnormal shock transmitted to the valve casing causes said frictional engagement means to be released.

11. The emergency shut-off valve of claim 10 in which the latch arm is provided with a fusible portion.

12. The emergency shut-off valve of claim 10 in which the casing is provided with a sub-chamber for housing the valve poppet when in open position.

13. The emergency shut-off valve of claim 10 in which the valve poppet is tiltably mounted for adjusting itself to the valve seat.

References Cited in the file of this patent

UNITED STATES PATENTS

| | | |
|---|---|---|
| 1,028,681 | Creighton et al. | June 4, 1912 |
| 1,133,506 | Schiele | Mar. 30, 1915 |
| 1,515,081 | Toelle | Nov. 11, 1924 |
| 1,708,867 | Bronander | Apr. 9, 1929 |
| 1,924,356 | Glab | Aug. 29, 1933 |
| 2,054,561 | Greenberg | Sept. 15, 1936 |
| 2,080,485 | Johnsen | May 18, 1937 |
| 2,165,640 | Marx | July 11, 1939 |
| 2,665,714 | Greenwood | Jan. 12, 1954 |
| 2,860,649 | Billian | Nov. 18, 1958 |